Sept. 17, 1940.   N. B. LUND   2,215,185
LIQUID CLARIFICATION
Filed Dec. 31, 1937   4 Sheets-Sheet 1

INVENTOR
NELS B. LUND,
BY Arthur Middleton
ATTORNEY.

Sept. 17, 1940.   N. B. LUND   2,215,185
LIQUID CLARIFICATION
Filed Dec. 31, 1937   4 Sheets-Sheet 3

INVENTOR
NELS B. LUND,
BY Arthur Middleton
ATTORNEY.

Sept. 17, 1940.      N. B. LUND      2,215,185
LIQUID CLARIFICATION
Filed Dec. 31, 1937      4 Sheets-Sheet 4

INVENTOR.
NELS B. LUND,
BY Arthur Middleton
ATTORNEY.

UNITED STATES PATENT OFFICE 2,215,185

LIQUID CLARIFICATION

Nels B. Lund, Seaford, N. Y.; Florence C. Lund, executrix of said Nels B. Lund, deceased, assignor to The Dorr Company, Inc., New York, N. Y., a corporation of Delaware Application December 31, 1937, Serial No. 182,901

8 Claims. (Cl. 210—12)

This invention relates to the clarification of liquids by removing therefrom flocculatable suspended solids or particles of turbidity. Such liquids include water, sewage, trade-wastes and the like that are organically polluted.

The polluted organic matter is suspended in the liquid. Most of it is settleable as sediment in the form of sludge, if the liquid be held in quiescence as in a sedimentation zone or clarifier. But a quantity of these suspended solids is so small as to be colloidal and therefore difficult to settle. Flocculation has lately been resorted to ahead of sedimentation for coagmenting or amassing suspended matter in flocs or floc colonies and conditioning them as to denseness to make them more readily susceptible to settling in a classifier, along with the suspended solids that are normally settleable. By causing the flocs to meander in the liquid, there is a tendency for the flocs to entrap and adsorb other fine solids that may escape direct flocculating treatment.

The flocs thus formed are fragile and easily disintegrated so they must be treated gently, for if once disintegrated they are difficult of reflocculation. Therefore, it is important that the floc-ladened liquid be drifted or passed as unmolestedly as possible from the flocculation zone to the sedimentation zone.

Again, as a major part of these flocs comprise organic matter that is putrescible and subject to becoming septic, bottom or floor sweeping must be provided in the sedimentation zone for continually raking or impelling the sediment or sludge to discharge said sediment or sludge resulting from the sedimentation of floc-ladened liquid. That is, care must be taken to avoid accumulations of organic solids if septicity conditions are to be avoided in the apparatus.

Such clarification is usualy carried out by subjecting the liquid to treatment in a flocculation zone and then in a sedimentation zone, from which sediment is removed by one path and clarified supernatant liquid is decanted by another path. Nowadays it is considered good practice to have these two zones disposed within the same general tank or basin.

A highly successful type of flocculation zone is exemplified in the patent to Smith—No. 1,893,-451; the patent to Darby—No. 2,081,851; and the patent to Fischer—No. 2,101,810, wherein there is illustratively shown such a zone comprising a plurality of current-producing bladed assemblies movable in repetitive paths centering from an axis and adapted for yielding integrated flocs conditioned for settleability.

But in such a type of flocculation zone it is desirable to prevent accumulation of settled sludge or sediment of settled flocculated material on the floor of the zone, such as tends to take place at times beneath and between the areas of paddle-induced agitation. The reason is that accumulations of such sediment have a tendency to become septic with the consequent upsetting of the flocculation and clarification processes. To prevent such undue or dangerous accumulations is one object of this invention. This object is attained by providing sediment or sludge raking or impelling devices travelling or reaching beneath the movable flocculating bladed means for continually, but not necessarily continuously, removing sediment from the vicinity thereof.

A further object of the invention is to pass while in submergence substantially all or a major part of sediment or sludge that has settled in a juxtaposed settler or sedimentation zone through the flocculation zone, especially without the use of pipes and under conditions that the sludge or sediment while passing through the flocculation zone is fully exposed to the flocculating forces current therein.

Another object of this invention is to devise an arrangement and design for such travelling sediment-impelling devices that they are inexpensive to build and install while being dependable and efficient in operation.

Since in the flocculation of raw sewage, scum usually accumulates in floating position on the liquid being flocculated, another object of this invention is to devise the sediment-impelling devices so that they may also function to remove this floating scum.

Further objects are to devise constructional details, and particularly of the sediment-raking elements and the skimming details.

With these, and possibly other objects in view, the invention is illustrated in the accompanying drawings which show the best embodiments of the invention, now known to me, although they are shown and described for illustrative purposes, since the invention is not limited thereto.

Figure 1:
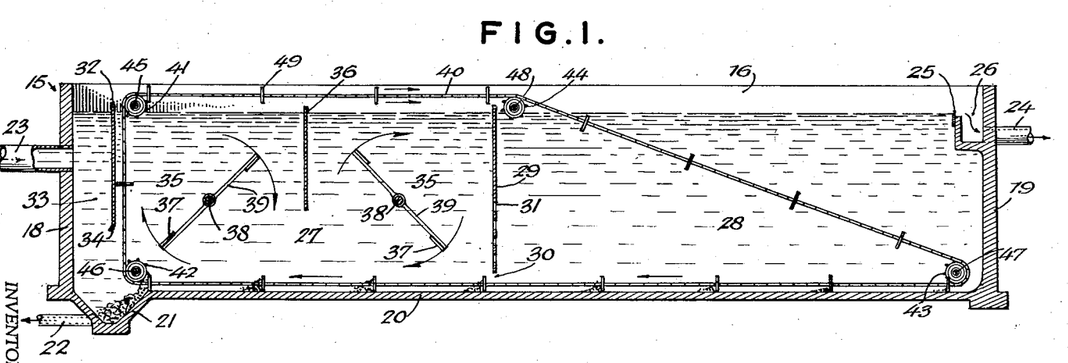
Fig. 1 is a longitudinal sectional elevation of a liquid clarifying apparatus provided with sediment scraping and scum skimming means having a uni-directional movement and traveling in a closed path embracing current-producing bladed assemblies, the section being taken on the line 1—1 of Fig. 2.
Figure 2:
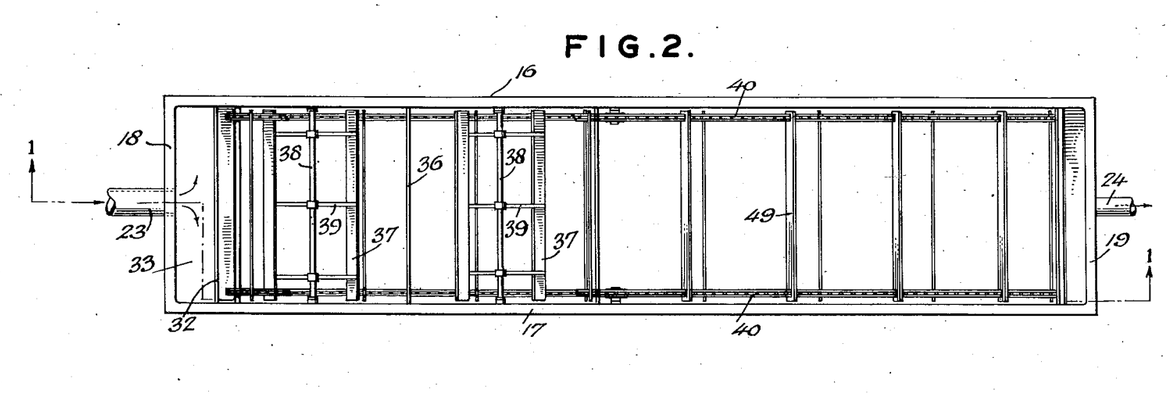
Fig. 2 is a plan view of the same, a portion of the upper stretch of the traveling sediment scraping and scum skimming means being broken away to illustrate more clearly the current-producing bladed assemblies of the flocculation zone.

Referring particularly to the form of the invention illustrated in Figs. 1 and 2 of the drawings 15 designates the tank or basin of rectangular or oblong form composed of vertical side walls 16 and 17, vertical front and rear end walls 18 and 19 and a horizontal bottom wall 20 provided at the front of the tank or basin with a sedimentation receiving sump 21 preferably located contiguous to the front wall 18 and extending entirely across the tank or basin and provided with a sediment or sludge discharge pipe 22 controlled by a suitable valve (not shown).

The front end wall 18 is provided at the upper portion with an influent inlet or feed pipe 23 which is located above the sedimentation receiving sump. The rear wall 19 of the tank or basin is provided with an outflow pipe 24 for the clarified supernatant liquid which flows over a weir 25 of a transverse launder 26 with which the discharge pipe 24 communicates.

The tank or basin 15 is divided into a flocculation zone 27 and sedimentation zone 28 by a vertically disposed transversely arranged apertured partition 29 extending entirely across the tank or basin and downwardly from a point adjacent the upper edges of the side walls 16 and 17 to a point adjacent the bottom of the tank or basin. The apertured or partial partition 29 terminates short of the bottom of the tank or basin to form a bottom passage 30 and provide a hydraulic communication between the flocculation zone and the sedimentation zone at the bottom of the tank and also to enable sediment or sludge to be scraped from the bottom of the sedimentation zone and impelled along the bottom of the flocculation zone to the sedimentation receiving sump 21. The transverse partition 29 which defines the adjacent limits of the flocculation zone, is provided in its lower portion with apertures 31 which also establish hydraulic communication between the flocculation zone and the sedimentation zone. The opposite limit of the sedimentation zone is defined by a vertical baffle or partition 32 extended entirely across the tank adjacent to but spaced from the front wall 18 to provide a passage 33 for the influent. The baffle or partition 32 extends downwardly from a point adjacent the top of the tank or basin to a point below the influent inlet pipe 23 and preferably more than half the distance between the top and bottom of the tank or basin but the baffle may be of any desired length and it is located above and terminates short of the sedimentation receiving sump 21 and has its lower edge 34 arranged at an angle and inclined downwardly in the direction of the front wall of the tank or basin, the purpose thereof being for stilling the inflowing feed liquid. This well is disposed above the sediment sump 21 and directs the heavier solids directly thereto.

The flocculation zone 27 is divided into a plurality of compartments or areas of paddle-induced agitation 35 by a transverse partition or baffle 36 extending downwardly from a point adjacent the top of the tank or basin to a point approximately midway between the top and bottom of said tank or basin but the baffle or partition 36 may be of any desired vertical dimension and one or more baffles or partitions may be employed to suit the dimensions of the flocculation zone. In the form of the apparatus illustrated in Figs. 1 and 2 a current-producing bladed assembly is provided for each of the areas of paddle-induced agitation but the number may of course be varied and each current-producing bladed assembly comprises spaced transversely disposed blades or paddles 37 movable in repetitive paths centering from an axis. The paddles or blades 37 are shown extending entirely across the flocculation zone but they may be of any desired length, and they are connected with a shaft 38 by a plurality of arms 39 arranged at spaced points as clearly illustrated in Fig. 2 of the drawings. The shaft 38 is journaled in suitable bearings of the vertical side walls and any suitable motivating means may be provided for rotating the current-producing bladed assemblies at the required speed for gently agitating the liquid within the flocculation zone to effect coagmentation of suspended material into settleable flocs without liability of disintegrating the floc colonies and at the same time to cause integrated flocs or floc colonies to meander in the liquid of the sedimentation zone and entrap and adsorb other fine solids that may escape direct flocculating treatment. The current-producing bladed assemblies move in the direction of the arrows in Fig. 1 of the drawings and the blades or paddles 37 move in the liquid within the compartments 35 and also through the liquid within the lower portion of the flocculation zone below the compartments 35 and produce a gentle agitation and current flow from one compartment to the other and also cause the floc laden liquid to drift from the flocculation zone into the sedimentation zone 28 with the flocs or floc colonies conditioned for settleability. Hydraulic communication between the flocculation zone and the sedimentation zone is provided by the apertures 31 of the partition 29 and by terminating the partition short of the floor of the tank or basin and the apertured partition with the hydraulic communication thus formed enables the necessary agitation and current flow to be carried on within the flocculation zone without affecting the quiescent condition of the liquid within the sedimentation zone necessary for the settling of the settleable solids.

The quiescent condition of the liquid within the sedimentation zone causes the normally settleable solids and the floc colonies conditions for settleability to settle upon the floor of the sedimentation zone from which the accumulated sediment is continually raked or scraped by traveling means having a uni-directional movement in a closed path encompassing the current-producing bladed assemblies. The traveling means comprises spaced endless belts or chains 40 arranged on and meshing with upper and lower front sprocket wheels 41 and 42, lower rear sprocket wheels 43 and upper intermediate sprocket wheels 44 mounted on upper and lower front transverse shafts 45 and 46, a lower rear transverse shaft 47 and an upper intermediate transverse shaft 48. The endless belts or chains 40 are located adjacent the vertical side walls of the tank or basin and consist of a lower horizontal stretch or portion, a front vertical stretch or portion, a horizontal top stretch or portion and an inclined stretch or portion. The horizontal stretch or portion extends substantially the entire length of the tank along the bottom of the same; the front vertical portion extends from the bottom to the top of the tank at the front portion of the flocculation zone; the horizontal top stretch or portion extends over the flocculation zone and the inclined stretch or portion passes through the sedimentation zone from the upper portion of the front end to the lower portion of the rear end as clearly illustrated in Fig. 1 of the drawings. The transverse shafts are journaled in suitable bearings of the vertical side walls of the tank or basin and the endless belts or sprocket chains are equipped with transverse blades or flights 49 extending entirely across the tank or basin and suitably secured intermediate their longitudinal edges to links of the endless chains and projecting above and below the same and forming with the chains an endless sediment or sludge scraping and a scum skimming means. The traveling sediment or sludge raking and scum skimming means, traveling or reaching beneath and between the areas of paddle-induced agitation prevent accumulation of settled sludge or sediment of flocculated material on the floor and the tendency of the same to become septic with consequent upsetting of the flocculation and clarification processes. The traveling means having uni-directional movement in a closed path embracing within it said bladed assemblies is alternately in submergence in the liquid in the tank and in emergence therefrom. The blades or flights continually rake or scrape accumulated sediment or sludge from the bottom of the tank or basin at the bottom of the sedimentation zone and the flocculation zone and impell the same to the sediment receiving sump and the blades or flights 49 after traveling along the bottom of the tank from the rear end of the same to the front end thereof as indicated by the arrows in Fig. 1 of the drawings move upwardly at the front of the tank and horizontally in a rearward direction at the top of the tank over the flocculation zone and skim therefrom the scum which accumulates at the surface of the liquid within the tank. The sediment raking or scraping and the scum skimming means move the sediment in one direction in the lower section of the closed path of travel and move floating scum in another direction in the upper section of the closed path of travel. Any suitable motivating means may be employed for actuating the endless sediment scraping and scum skimming carrier.

In the operation of the liquid clarifying apparatus, the liquid either previously dosed or treated or raw enters the tank or basin through the influent inlet pipe 23 and is subjected to coagmentation in the flocculation zone causing amassment of the floc nuclei into colonies of size and density that render them readily settleable with the normally settleable solids and at the same time the meandering of the floc colonies in the liquid of the flocculation zone trap and absorb other fine solids that may escape direct flocculating treatment. The floc laden liquid is drifted from the flocculation zone into the sedimentation zone without disintegration of the floc colonies which in the quiescent liquid of the sedimentation zone settle with the normally settleable solids and are removed from the floor or bottom of the tank or basin and impelled to the sediment receiving sump. The scum skimmed by the blades or flights 49 may be removed from the tank or basin by any suitable means and the supernatant liquid flows over the weir 25 into the launder 26 and passes from the tank through the outlet or effluent discharge pipe 24. The bladed or paddle assemblies 37, 38 and 39 have a tendency to cause the lighter particles of sludge that have settled on the bottom 20 to be swept up into suspension and circulation in the flocculation zone which in turn aids the flocculation process, whereas the heavier sediment remains in subsidence upon the bottom. The traveling flights 49 impel or convey sediment while in submergence from the sedimentation zone to the flocculation zone so the finer or lighter particles of this also become subject to such sweeping upwardly into suspension and flocculation that may be current or extant therein. At the same time the heavier particles thereof are joined with the heavier particules in the flocculation zone and they are jointly pushed into the discharge sump 21. In other words there is a rolling up of smaller or lighter solids in the flocculation zone to resuspend them.

Figure 3:
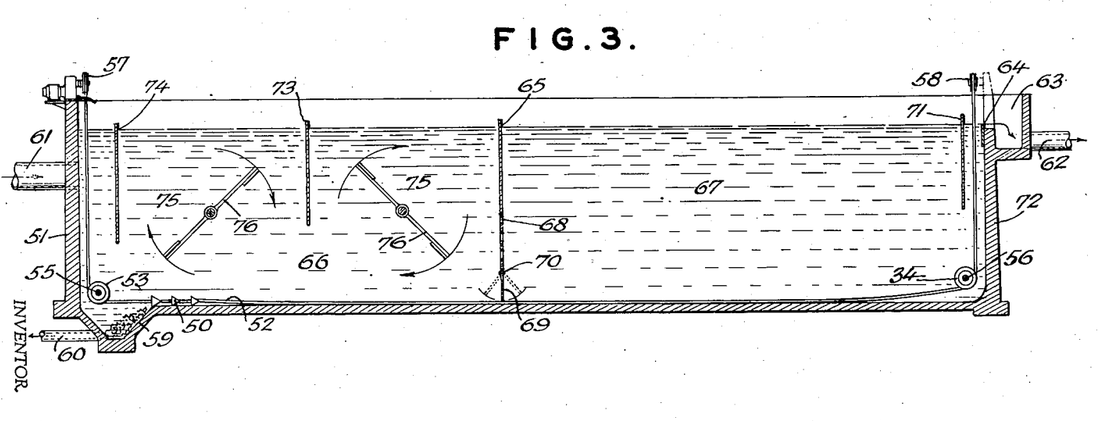
Fig. 3 is a longitudinal sectional elevation of a liquid clarifying apparatus provided with a reciprocable traveling sediment scraping means, the section being taken on the line 3—3 of Fig. 4.
Figure 4:
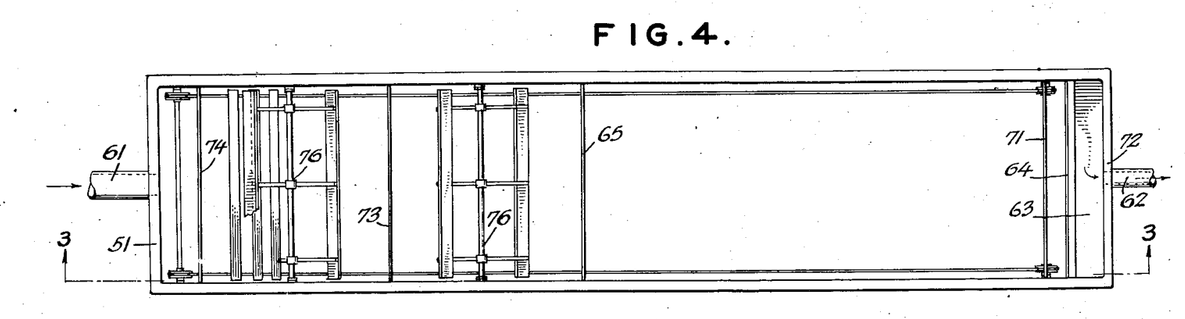
Fig. 4 is a plan view of the liquid clarifying apparatus shown in Fig. 3, a portion of one of the current-producing bladed assemblies being broken away to show more clearly the reciprocable traveling sediment scraping means.

In Figs. 3 and 4 of the drawings is illustrated a liquid clarifying apparatus in which the sediment or sludge raking or impelling device is reciprocable and is equipped with a plurality of scraper bars or members 50 extending entirely across the bottom of the tank or basin 51 and connected adjacent their ends to cables 52 or other suitable flexible connections. These cables 52 extend longitudinally of the tank or basin at the bottom thereof and at opposite sides of the same and are arranged on and extend upwardly from grooves pulleys 53 and 54 of shafts 55 and 56 located at the front and rear ends of the tanks or basin and journaled in suitable bearings of the vertical side walls of said tank or basin which is of substantially the same construction as the tank or basin 15 heretofore described. The cables 52 extend upwardly from the lower pulleys 53 and 54 to upper pulleys 57 and 58 located at the top of the tank or basin at the ends thereof and arranged in planes at right angles to the planes of the lower pulleys 53 and 54 for changing the direction of the cables 52. The cables 52 are designed to be connected with suitable motivating means for actuating the cables simultaneously first in one direction and then in the opposite direction for moving the groups of scraper bars or members back and forth from one end of the tank or basin to the other for continually impelling the sludge or sediment of settled flocculated material on the floor of the tank or basin to the sediment receiving sump thereof.

The scraper bars or elements 50 are substantially triangular in cross section and each presents a front vertical sediment or sludge impelling face and upper and lower inclined faces and has a relatively sharp rear edge, the inclined faces and the sharp rear edge enabling the scraper bars or members to pass over or through accumulated sludge or sediment on the bottom of the tank or basin during the backward or return movement of the traveling sediment or sludge raking means without impelling the sludge toward the rear end of the tank or basin. During the forward movement of the sediment or sludge raking or impelling means the scraper bars or members 50 present their front vertical faces to the sludge and positively impell the sludge or sediment to the sludge receiving sump 59 and the sludge discharge pipe 60 thereof. While a group of three of the scraper bars or members 50 is shown in Figs. 3 and 4 it will be understood that the number of the scraper bars or members 50 may be varied. Any suitable motivating means may be connected with the cables 52 for moving the scraper bars or members forwardly and backwardly from one end of the tank or basin to the other and as no claim is made in the present application to any particular construction for motivating the sediment or sludge raking or impelling devices detail illustration and description thereof are deemed unnecessary.

The tank or basin 51 is provided at the front with an influent inlet pipe 61 and at the rear end with an effluent outflow pipe 62 extending from a launder 63 into which the supernatant liquid is decanted and which is provided with a weir 64. The tank or basin is divided by a transversely disposed apertured or partial partition 65 into a flocculation zone or section 66 and a sedimentation zone or section 67 into which floc laden liquid is drifted through apertures 68 in the partition 65. The partition 65 extends from the top portion of the tank to within a short distance of the bottom of the tank and the space between the lower edge of the partition 68 and the bottom of the tank is normally closed by a valve 69 consisting of a plate or blade hinged at its upper edge at 70 to the lower edge of the vertical partition 68 and adapted to be swung from the full line position illustrated in Fig. 3 of the drawings to either of the dotted line positions shown in the said figure by the scraper bars or members 50 to permit the latter to pass beneath the partition 68 in traveling back and forth from one end of the tank or basin to the other.

The partition 65 defines the adjacent limits of the flocculation zone or section and the sedimentation zone or section which is provided at its rear end with a transverse baffle or partition 71 spaced from the rear end wall 72 of the tank or basin to provide a passage for the rear upwardly extending portions of the cables 52 and extending downwardly from the top portion of the tank or basin to about midway the top and bottom of the same, but the vertical dimension of the baffle or partition 71 may be varied. The flocculation zone or section is divided by transversely disposed baffles or partitions 73 and 74 into areas or compartments 75 of paddle-induced agitation. The baffle or partition 73 extends downwardly from the upper portion of the flocculation zone or section of the tank or basin to about midway between the top and bottom of the same and the other partition 74 which is slightly greater in its vertical dimension than the partition 73 is spaced from the end wall 61 of the tank or basin to provide a space or passage for the front upwardly extending portions of the cables 52. This baffle 74 corresponds to baffle 32 of Fig. 1 especially as to function. Current-producing bladed assemblies 76 operate in the flocculation zone or section and are constructed substantially the same as those heretofore described and move in repetitive paths about a central axis as indicated by the arrows in Fig. 3 of the drawings. The operation of the liquid clarifying apparatus shown in Figs. 3 and 4 is substantially the same as that heretofore described and the floc laden liquid is drifted through the apertures 68 of the partition 65 from the flocculation zone or section into the sedimentation zone or section. The hinged valve 69 at the lower end of the partition 65 is normally closed and contributes to the quiescent condition of the liquid within the sedimentation zone.

Figure 5:
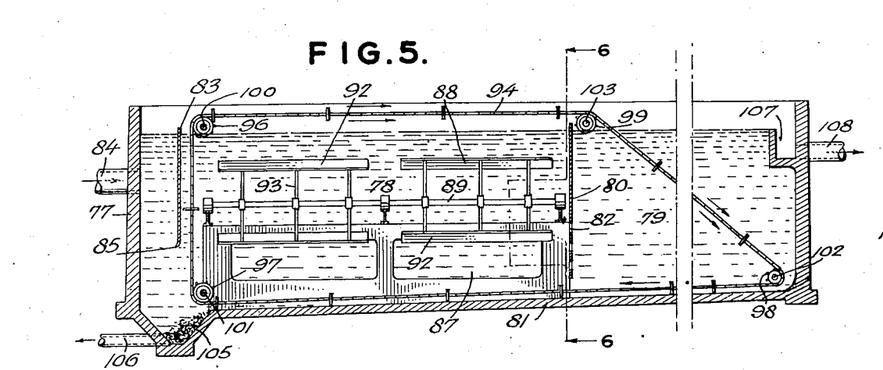
Fig. 5 is a central longitudinal sectional elevation of a liquid clarifying apparatus having current-producing bladed assemblies disposed longitudinally of the flocculation zone, the apparatus being broken away at the sedimentation zone for convenience of illustration.
Figure 6:
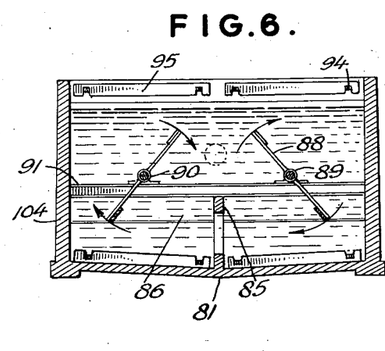
Fig. 6 is a transverse sectional elevation taken on the line 6—6 of Fig. 5.

The liquid clarifying apparatus illustrated in Figs. 5 and 6 of the drawings comprises a tank or basin 77 divided into a flocculation zone or section 78 and a sedimentation zone or section 79 by a transversely disposed apertured or partial partition 80 extending downwardly from the upper portion of the tank or basin to within a short distance of the bottom 81 thereof and provided in its lower portion with apertures 82. The partition 80 terminates at its lower edge above and in spaced relation with the bottom 81 and the space between the bottom 81 of the tank or basin and the lower edge of the partition 80 and the apertures 82 thereof provide hydraulic communication between the flocculation zone and the sedimentation zone to permit floc laden liquid to be drifted from the flocculation zone into the sedimentation zone. The partition 80 defines the adjacent limits of the flocculation zone and the sedimentation zone and the other limit of the flocculation zone is defined by a transverse partition or baffle 83 extending downwardly from the upper portion of the tank or basin to a point slightly below midway between the top and bottom thereof and spaced from the front wall 77 of the tank to provide a passage for the influent feed to the tank through the influent inlet pipe 84 and the lower edge 85 of the baffle or partition 83 is preferably arranged at an inclination and extends downwardly in the direction of the front wall of the tank or basin.

The bottom 81 of the tank is laterally inclined downwardly and inwardly from the side walls to the longitudinal center of the bottom, as clearly shown in Fig. 6 of the drawings, and the flocculation zone is divided by an apertured longitudinal partition 85 into areas or compartments 86 of paddle-induced agitation. The longitudinal partition or baffle 85 is provided with relatively large openings or apertures 87 and current-producing bladed assemblies 88 are located at opposite sides of the central longitudinal partition and are disposed longitudinally of the tank preferably in groups on continuous longitudinal shafts 89. While two groups of blades or two bladed assemblies are shown at each side of the flocculation zone in Figs. 5 and 6 the number may be varied to suit the dimensions of the tank or basin. The longitudinal shafts 89 which may be rotated at the desired speed by any suitable motivating means are journaled in suitable bearings 90 mounted on transverse frame members 91 extending entirely across the tank or basin at the flocculation zone thereof and located at the upper edge of the longitudinal partition 85 and preferably connected therewith. The transverse frame members which may consist of I-beams or any other suitable material are located centrally of the upper edge of the longitudinal partition 85 and at the ends of the same but any desired number of such frame members may of course be employed.

The bladed assemblies, which are constructed substantially the same as the bladed assemblies heretofore described and which are movable in repetitive paths centering from an axis, consist of spaced longitudinally disposed blades or paddles 82 connected with the longitudinal shafts 89 by arms 93 located at spaced points disposed centrally and at the terminal portions of the assembly, but any number of the arms 83 may be provided for supporting the current-producing blades or paddles 82 from the longitudinal shafts 89. Any suitable motivating means may be employed for rotating the longitudinal shafts for moving the bladed assemblies at the desired or required speed in the same direction as indicated by the arrows in Figure 6 of the drawings. The blades or paddles in moving in their repetitive paths are carried through the areas of paddle-induced agitation in the compartments 86 at the lower portion of the flocculation zone and also through the upper portion of the flocculation zone and yield integrated flocs conditioned for settleability and caused to meander through the liquid and trap and adsorb minute solids which might otherwise escape flocculation. The openings 87 are relatively large to permit the floc-laden gently agitated liquid to pass through the baffle or partition 85 from one compartment 86 into the other.

The floc-laden liquid drifts through the apertures 82 of the partition 80 and also through the space beneath the lower edge of the partition without disintegration of the floc colonies and without disturbing the quiescent condition of the liquid in the sedimentation zone. The bladed assemblies as in the liquid clarifying apparatus illustrated in Figures 1 and 2 of the drawings are encompassed by a combined sediment or sludge raking or impelling and scum skimming means traveling in a closed path and comprising endless belts or chains 94 arranged in pairs, the members of each pair being connected by transversely disposed blades or flights 95 arranged at intervals and connected intermediate their longitudinal edges to the chains or belts and projecting inwardly and outwardly with respect to said chains or belts for scraping or raking from the floor of the tank or basin accumulation of settled sludge or sediment of settled flocculated material and also for skimming the scum collecting on the surface of the liquid within the tank or basin. The endless sprocket chains are arranged on and mesh with upper and lower front sprocket wheels 96 and 97, lower rear sprocket wheels 98 and upper intermediate sprocket wheels 99. The sprocket wheels 96, 97, 98 and 99 are mounted on transverse shafts 100, 101, 102 and 103 which are journaled in suitable bearings in the vertical side walls 104 of the tank or basin. The sludge or sediment raking and scum skimming means are located at opposite sides of the central longitudinal baffle or partition 86 and each comprises a lower approximately horizontal stretch, a front vertical stretch, a horizontal top stretch extending over the flocculation zone, and an inclined rear stretch which connects the upper and lower stretches of the sludge or sediment raking and scum skimming means and which is located within the sedimentation zone. The endless chains and the connecting flights form endless chain drags which travel in a closed path in the direction of the arrows in Figure 5 of the drawings and rake or scrape the sediment in one direction in the lower section of said path and move floating scum in another direction in the upper section of said path. The bottom or floor of the tank or basin preferably has a slight inclination from the rear end of the tank or basin to the sediment receiving sump 105, which is located at the front end of the tank or basin. The sediment receiving sump extends transversely entirely across the tank or basin and is provided with a sediment discharge pipe 106. The supernatant liquid is decanted from the sedimentation zone into a transverse launder 107 designed to be provided with a suitable weir and discharging through an effluent outflow discharge pipe 108.

Figure 7:
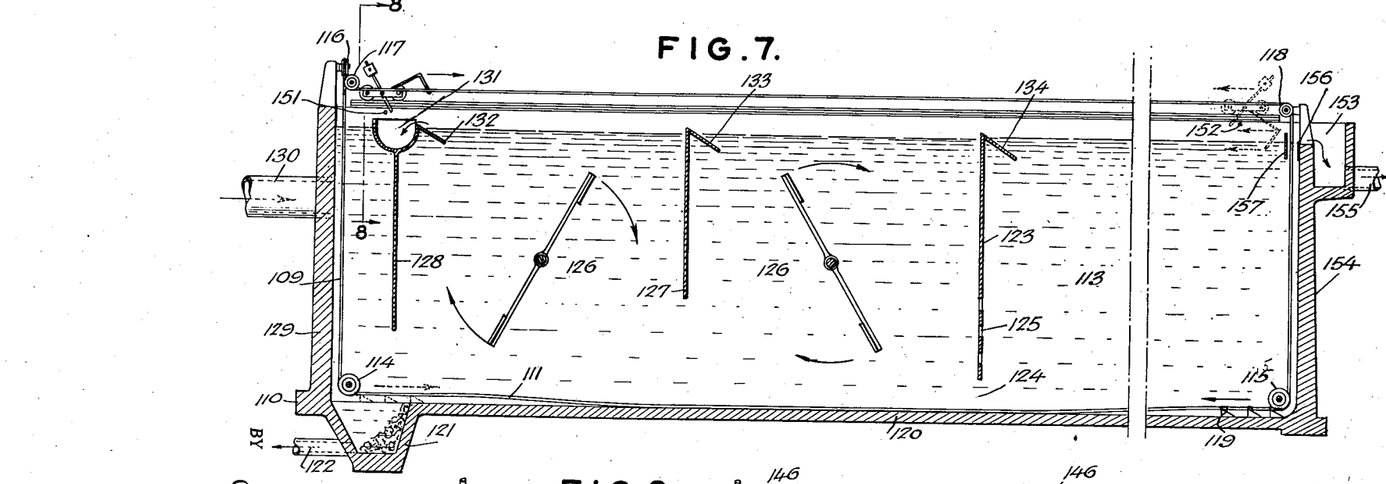
Fig. 7 is a longitudinal sectional elevation of a liquid clarifying apparatus having reciprocable sediment scraping means traveling in a closed path encompassing substantially the flocculation zone and the sedimentation zone and equipped with an automatically operating scum skimming device.
Figure 8:
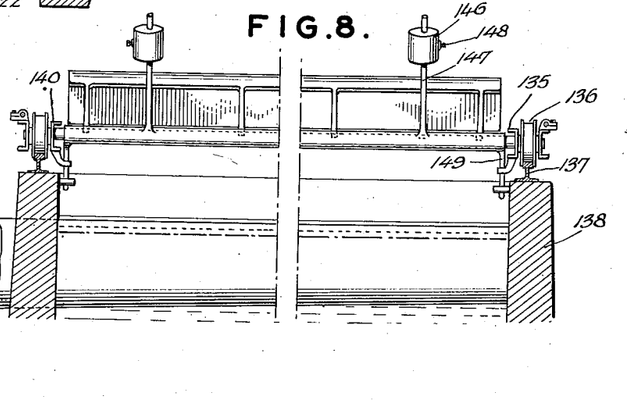
Fig. 8 is a transverse sectional view taken on the line 8—8 of Fig. 7.
Figure 9:
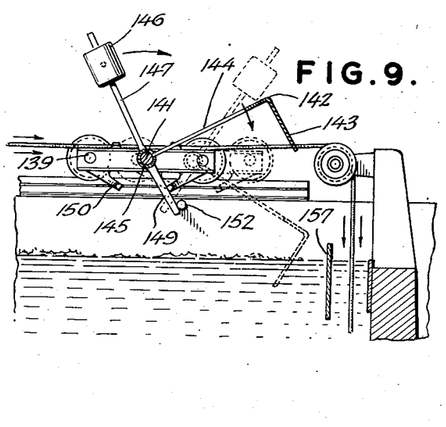
Fig. 9 is an enlarged detail sectional view of the scum skimming device.

In Figures 7 to 9, inclusive, of the drawings, is illustrated a liquid clarifying apparatus having a reciprocable sludge or sediment scraping or raking and a scum skimming means 109 arranged within a basin or tank 110 and comprising spaced endless cables 111 or other suitable flexible connections extending longitudinally of the tank or basin at the top and bottom thereof and vertically from the top to the bottom of the tank or basin at the front and rear ends of the same and embracing the flocculation zone 112 and the sedimentation zone 113 of the tank or basin. The endless cables, which are located at opposite sides of the tank or basin, are arranged on lower front and rear grooved pulleys 114 and 115, front upper grooved pulleys 116 and 117 and rear grooved pulleys 118. The front upper grooved pulleys are arranged in pairs in planes at right angles to each other for changing the direction of the cables, which at the front of the tank or basin extend from the lower pulleys 114 to the upper pulleys 116 and then to the upper pulleys 117 from which the endless cables pass to the upper rear pulleys 118. The grooved pulleys are arranged on suitable shafts or spindles, which may be mounted in any desired manner.

The lower stretches of the endless cables 111 are suitably secured to a plurality of scraper bars or members 119 approximately triangular in cross section and, while shown arranged in a group of three in Figure 7 of the drawings, any desired number of scraper bars or members 119 may be provided. The scraper bars or members 119 have horizontal lower faces, inclined upper faces and vertical front faces which are presented to the sludge or sediment on the floor 120 of the tank or basin. The flat lower faces of the scraper bars or members rest upon the bottom or floor 120 of the tank or basin and said scraper bars or members 119 are moved by the cables from the full line position at the rear end of the tank the dotted line position at the front end of the tank for scraping or raking the sludge and impelling it to the sediment receiving sump 121 located at the front end of the bottom 120 of the tank or basin and extending entirely across the same and provided with a sludge discharge pipe 122. The forward movement of the raking or scraping blades or members is indicated by the full line arrow in Figure 7 of the drawings, and the return movement is indicated by the arrow shown in dotted lines at the front end of Figure 7. As any suitable means may be employed for motivating the reciprocable sludge raking and scum skimming means, and as the particular means for reciprocating the ropes or cables does not constitute a portion of the present invention, detailed illustration and description of such means are deemed unnecessary. In the return movement of the scraper bars or members 119, the relatively sharp rear edges formed by the inclined upper face and horizontal lower face of said bars or members 119 enable the bars or members 119 to pass through or under sludge or sediment without moving the same towards the rear end of the tank or basin.

A vertical transverse apertured partition 123 defines the adjacent limits of the flocculation zone or section of the tank and the sedimentation zone or section of the tank. The partition 123 extends downwardly from the upper portion of the tank to within a short distance of the bottom 120 of the tank to provide a space or passageway 124 which, with the apertures 125 of the baffle or partition 123, provides hydraulic communication between the flocculation zone and the sedimentation zone and enables the floc-laden liquid to be drifted gently from the flocculation zone into the sedimentation zone without disintegrating the floc colonies or materially affecting the quiescent condition of the liquid within the sedimentation zone. The flocculation zone 112 is divided into compartments or areas 126 of paddle-induced agitation by vertical transverse baffles or partitions 127 and 128 extending downwardly from the upper portion of the tank or basin and terminating short of the bottom of the same. The baffle or partition 128 is spaced from the front wall 129 of the tank to provide a space or passage for the influent liquid fed to the tank through an influent inlet pipe 130. A scum receiving trough 131 is arranged at the upper edge of the baffle or partition 128, and ramps 132, 133 and 134 are provided at the trough 131 and the upper edges of the partitions or baffles 127 and 123 to enable floating scum to be skimmed over the said baffles or partitions 127 and 123 and into the trough 131. The ramps 132, 133 and 134 are inclined and extend downwardly and rearwardly from the upper edge of the rear side of the transverse scum receiving trough 131 and the upper edges of the baffles or partitions 127 and 123.

The scum skimming device comprises in its construction a carriage 135 extending across the top of the tank or basin and provided at opposite sides thereof with flanged wheels 136 arranged to run on rails 137 mounted upon the side walls 138 of the tank or basin. The flanged wheels, which are arranged in pairs, are mounted on suitable spindles or axles 139 carried by channel bars 140 constituting the ends of the carriage and connected by a transverse shaft 141, on which is mounted for pivotal movement an oscillatory shiftable scum skimming device 142. The channel bars 140 and the transverse shaft 141 constitute the framework of the carriage, but the latter may be of any other desired construction, as will be readily understood. The scum skimming device 142 consists of a blade or skimming element 143 connected by arms 144 with a sleeve 145 mounted on the shaft 144 for limited rotary movement to enable the skimming device to be shifted from the inoperative position illustrated in full lines in Figure 9 of the drawings to operative position shown in dotted lines in Figure 9. When the scum skimming device is in the operative position illustrated in dotted lines in Figures 7 and 9, it is moved by the endless cables from the rear end of the tank to the front end thereof to a position above the scum receiving trough 131 and the ramp thereof, and the scum which collects on the surface of the liquid within the tank is skimmed off into the trough. The scum skimming blade or member 143 is arranged at right angles to the arms 144 and when in operative position extends slightly below the surface of the liquid within the tank and is adapted to ride over the ramps 132, 133 and 134, which prevent the baffles or partitions 123 and 127 and the trough 131 from interfering with the forward skimming movement of the skimming device. When the scum skimming device reaches or nearly reaches the limit of its forward movement, it is automatically operated by the means hereinafter described for lifting it from its operative position to an inoperative position, and it is maintained in either of such positions by adjustable weights 146 mounted on arms 147 rigid with and extending upwardly from the sleeve 145 and adapted to be swung to either side of a vertical position. The weights 146, which are slidably mounted on the upwardly extending arms 147, are secured to the same in their adjustment by clamping screws 148 or other suitable means.

The sleeve 145 is provided at its ends with tappet arms 149 located at opposite sides of the tank or basin and operating between and having its movement limited by spaced lugs 150 depending from the end bars 140 of the carriage and extending inwardly beyond the inner faces of the side walls 138 of the tank or basin. The skimming device is automatically shifted to move it from its operative to its inoperative position and from its inoperative position to operative position by abutments 151 and 152 consisting of projecting stop pins extending from the inner faces of the side walls 138 of the tank or basin and arranged in the path of movement of the tappet arms 149 and adapted when the scum skimming device reaches the forward limit of its effective skimming movement to be engaged by the tappet arms to shift the scum skimming device to an inoperative position, as illustrated in full lines in Figure 7 of the drawings. When the scum skimming device approaches or reaches the limit of its return or backward movement, the tappet arms are carried into contact with the projecting pins or abutment members 152 as illustrated in Figure 9 of the drawings, and the continued backward movement of the carriage will swing the scum skimming device in the direction indicated by the arrows in Figure 9 of the drawings to lower the skimming blade or member 143 from its elevated inoperative position to its lowered operative position.

The supernatant liquid is decanted from the sedimentation zone into a transverse launder 153 extending across the rear end wall 154 of the tank or basin and having an outflow pipe 155 for the discharge of the clarified effluent. The launder 153 is provided with a weir 156, and a scum retaining guard 157 extends across the rear end of the tank or basin at the upper portion thereof and projects above the surface of the liquid within the sedimentation zone to prevent any other scum floating on the surface of the liquid being carried with the clarified effluent into the launder 153.

Figures 10, 11:
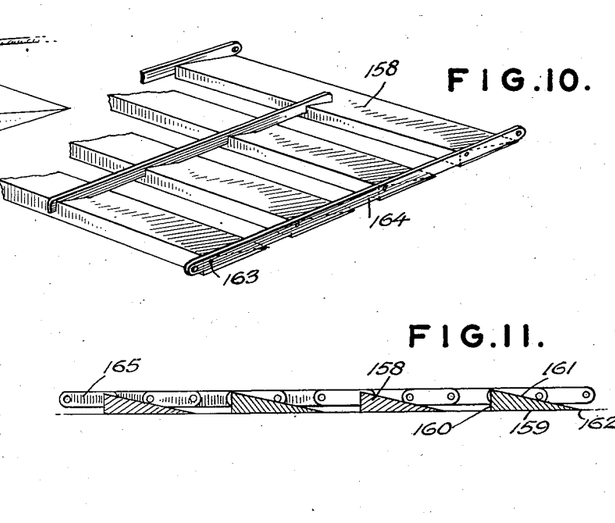
Fig. 10 is a detail perspective view of a group of sediment scraping elements or members.
Fig. 11 is a longitudinal sectional view of the group of scraping elements shown in Fig. 10.
Figure 12:
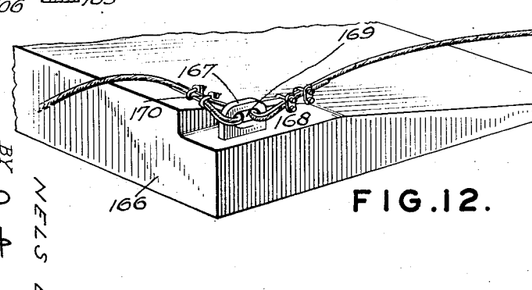
Fig. 12 is a detail perspective view of another form of sediment scraping element or member.
Figure 13:
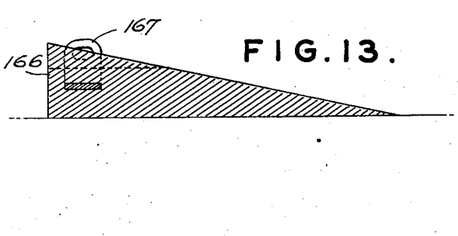
Fig. 13 is a longitudinal sectional view of the scraping element or member shown in Fig. 12.

In Figures 10 and 11 of the drawings is illustrated a group of scraper bars or elements 158 substantially triangular in cross section and each having a flat horizontal lower face 159 and a plane vertical front face 160 and an inclined upper face 161 which, with the horizontal lower face, forms a relatively sharp rear edge 162. The group of sludge or sediment raking or scraping bars or members form a raking or scraping unit which may consist of any preferred number of bars or members 161, which as illustrated in Figure 10 may be connected by pivots 163 with relatively long links 164 or with short links 165, as shown in Figure 11 of the drawings. Instead of employing a sludge raking or scraping unit composed of a plurality of bars or members 158, a raking unit 166 may be employed, consisting of a single element of a size corresponding to the dimensions of the raking or scraping unit formed by the plurality of bars or members 158. When the raking or scraping unit is composed of a single member, it is preferably provided adjacent its front end at each side with a lug or ear 167 located in a recess 168 and having an opening 169 to enable the ends 170 of the cable to be readily connected to the raking or scraping unit 166 which is of the same form as the smaller raking or scraping bars or members 158.

I claim:

1. Liquid clarifying apparatus comprising a tank having a bottom, a feed liquid inlet, a flocculation zone therein, having in said zone a plurality of current producing bladed assemblies movable in repetitive paths centering from an axis, and a sediment discharge adjacent said flocculation zone; a settler in which suspended solids settle in quiescence to form sediment and to which flocculated liquid may pass from said zone, and positively operated sediment impelling means designed and effective to impel sediment from said sedimentation zone to said flocculation zone and from the latter to said discharge.

2. Apparatus according to claim 1 with the addition of a baffle adjacent said feed inlet for stilling the incoming feed, and wherein said sediment discharge is disposed thereunder.

3. Liquid clarifying apparatus comprising a tank having a flocculation zone and a sedimentation zone, a partial partition defining the adjacent limits of said zones but past which flocculated liquid can drift to said sedimentation zone, a feed of incoming liquid, a plurality of current producing bladed assemblies in said flocculation zone movable in repetitive paths centering from an axis, a clarified effluent overflow, a sediment discharge, and common traveling means reaching operatively into said zones on each side of said partition for impelling to said discharge sediment from both zones.

4. The process of liquid clarification which comprises subjecting liquid to be treated successively to flocculation in one zone and sedimentation of solids in a horizontally juxtaposed zone, conveying the sediment from said horizontally juxtaposed sedimentation zone in contact with the body of liquid being treated, in a substantially horizontal direction along a bottom common to both zones back into the flocculation zone to be exposed to flocculation forces current in that zone and effective upon a lighter fraction of the sediment, to roll it into re-suspension, and discharging sediment from the flocculation zone at a point spaced from the sedimentation zone.

5. Apparatus according to claim 1, in which said sediment impelling means travels in a closed path in a vertical plane that embraces within it said bladed assemblies.

6. Apparatus according to claim 1, in which said sediment impelling means for a sludge scraping device movable in forward direction for impelling sediment to the sediment discharge and movable in the opposite or rearward direction substantially without impelling the sediment along the tank bottom, which device comprises a sludge engaging element having a horizontally extending sharp edged portion adaped to be closely adjacent to the tank bottom, which sludge engaging element is movable along the tank bottom in a reciprocating fashion and defined by a front face designed for impelling sludge to the sediment discharge when moved in forward direction, and furthermore defined by a trailing or rearwardly, downwardly sloping substantially plane face, extending from the top edge portion of said front face and terminating in said sharp edged portion, said sharp edged portion in conjunction with said rearwardly sloping plane face being capable of cutting underneath any sediment during the rearward movement of said sludge engaging element.

7. Liquid clarifying apparatus, comprising a tank having two compartments of which one is a flocculation zone and the other is a sedimentation zone in which latter suspended solids settle in quiescence to form sediment and to which flocculated liquid passes from the flocculation zone, an incoming liquid feed for the flocculation zone, a longitudinally disposed apertured partition in the flocculation zone, a plurality of longitudinally disposed current-producing bladed assemblies in the flocculation zone at opposite sides of the longitudinal partition, each assembly being movable in repetitive paths centering from an axis and adapted for yielding integrated flocs conditioned for settleability, a clarified effluent outlet for the sedimentation zone, a sediment discharge, and traveling means in said tank at opposite sides of the apertured partition for impelling to said discharge sediment from both of said zones.

8. Liquid clarifying apparatus comprising a tank having a bottom, a feed liquid inlet, a sediment discharge, and a flocculation zone therein, having in said zone a plurality of current producing bladed assemblies movable in repetitive paths centering from an axis; a settler in which suspended solids settle in quiescence to form sediment and to which flocculated liquid may pass from said zone, and a sediment impelling endless element surrounding said bladed assemblies in a vertical plane, and adapted to convey sediment from both said zones to said sediment discharge.

NELS B. LUND.